March 31, 1959     A. A. ROOT     2,879,818
THERMOPLASTIC CONTAINER AND METHOD OF MAKING SAME
Filed June 7, 1955
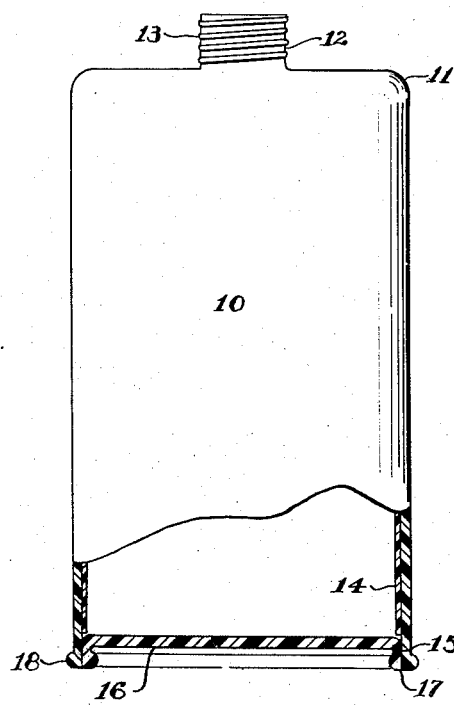
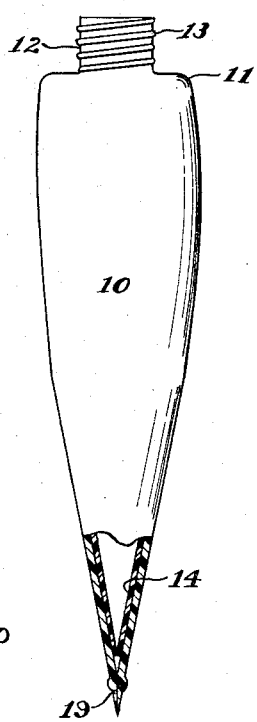
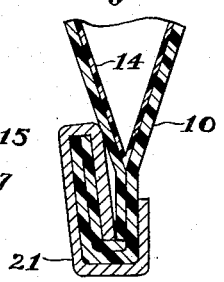
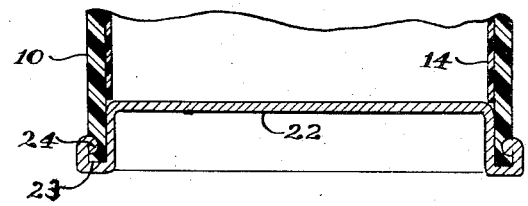
INVENTOR
Andrew A. Root
BY Cushman, Darby & Cushman
ATTORNEYS

United States Patent Office

2,879,818
Patented Mar. 31, 1959

2,879,818

THERMOPLASTIC CONTAINER AND METHOD OF MAKING SAME

Andrew A. Root, Concord, Mass., assignor to Bradley Container Corporation, Maynard, Mass., a corporation of Delaware Application June 7, 1955, Serial No. 513,731

13 Claims. (Cl. 150—.5)

This invention relates to thermoplastic containers which have relatively thin, seamless walls of uniform thickness in order to reduce transmission of water, water vapor, aromatics, flavors and hydrocarbons.

During the last decade, the use of polyethylene films, blown bottles, extruded tubing, tubes and bottles fabricated from extruded tubing, have become very numerous. However, their use for the packaging of many products has been greatly handicapped by the fact that while polyethylene is a relatively good moisture proof barrier to the transmission of water and water vapor, it is easily penetrated by certain aromatic compounds commonly used to impart agreeable odors to cosmetics, detergents, lotions, shaving creams and those used to impart flavor to products such as toothpastes. With many of these products the desirable perfumes or flavorings are largely lost during storage in polyethylene bottles of normal wall thickness for as little as a year at normal room temperatures. Furthermore, the walls of polyethylene packages allow oxygen to penetrate inwards freely so that if products containing unsaturated natural fats and oils are contained therein, there is danger of their becoming rancid. In the same way, oxygen can penetrate to discolor some delicately colored products such as certain of the tomato pastes, more particularly those made in Europe from the Italian tomato. In addition, even though it is in no way seriously degraded by the phenomena, polyethylene allows the transmission through it (probably by dissolving on one side and excretion on the other) of certain types of solvents, oils, greases, etc., particularly those found in so-called ointments and emulsified creams. This penetration results in a slightly greasy, disagreeable feel on the exterior of the tube and it has long been the desire of those using the material to find a satisfactory method of obviating this.

During the last few years the manufacture of polyethylene collapsible tubes and bottles by the injection molding of a head onto or fastening a separately molded head piece by cement or fusion to one end of a relatively thin walled extruded tube about .012" to about .030" thick, has become very popular and many have sought a method of coating these to obviate the above disadvantages and cut down the penetration through the polyethylene of aromatic flavorings, oxygen, solvents and oils, etc. This work has shown that many materials can be used to form very thin films on the walls of the polyethylene which greatly retard such penetration of the polyethylene. However, it has been found that many of these expedients have poor adhesion to the surface of the polyethylene and in time flake off as thin skin-like membranes. Further, it has been found with coatings that can be made to adhere to the interior surface of polyethylene containers, there is a problem of heat sealing these containers where the seal area is contaminated with the coating material.

Faced with the above dilemmas I have discovered that it is possible by using the following described method to satisfactorily coat the interior of a polyethylene tube with either plastics such as polyvinyl alcohol, Saran, nitrocellulose, etc. dissolved in the solvents commonly used with them or with water solutions of water soluble polymers such as polyvinyl alcohol or partially hydrolized polyvinyl acetate or latices or emulsions of plastics such as commonly result from the well-known emulsion methods of polymerizing monomers and mixtures of monomeric substances when making plastics such as the polyvinyls, the Sarans and many other polymers and copolymers well known to those versed in the properties of plastics.

The method I have found to permit such coating comprises the treatment of the interior of open ended collapsible tubes or bottles by any one of the well known methods commonly used to facilitate the printing of polyethylene. These methods comprise the oxidizing flame treating of surfaces, the treatment of surfaces with oxidizing liquids or gases such as chromic acid mixtures, solutions containing chlorine, etc. and the treatment of surfaces with high voltage corona discharges. These are all used and are well known to those skilled in the art, but have never before been used to treat and coat the interior surfaces of collapsible tubes and if so used, are prone to destroy the sealability of the interior surfaces after filling. The treatment of this invention permits coatings of the types mentioned and specifically water solutions and water emulsions thereof to be applied by either filling and draining the tubes or by applying the material with a controlled liquid stream or spray or by rollers to the interiors. The treatment not only greatly enhances the adhesion of the final dried film to the flexible sidewalls which are flexed when squeezing out the final contents but also results in smooth, uniform coatings as opposed to irregular and spotty coatings when many of these are applied without prior treatment of the interior. As a further part of my invention, I have found that if these coatings are applied to all but a small section of the open end of the tube, the resulting benefits of coating are not seriously impaired and the sealability of the open end is fully preserved. In addition, the inherent slight additional thickness of coating material along the edge of the coated area adjacent to the uncoated seal area often acts as a deformable gasket to effectively coat the inside edge of the seal or fusion area. The combination of these two steps permits this method of coating to be used on collapsible tubes or bottles or even pillow-like packages without the use of expensive solvents to produce uniform wetting.

The methods that I have found most suitable for treatment of the interior surfaces without unduly destroying their sealability because of the preliminary treatment and the methods which I have found to comprise satisfactory solution of the problem of coating of all but a small portion of the interior wall of the open end comprise the following:

A continuous high voltage discharge treatment is used at the extruder to treat the inside of the polyethylene tube. The tube is drawn over a ring electrode held in position by a supporting means connected to the die. The air gap distance between the ring and the polyethylene wall of the tube is in the approximate range of .006" to .030". The other electrode is held against or close to the outside surface wall of the tube directly opposite the inner electrode ring. Satisfactory results have been obtained using secondary voltage of 10,000 to 15,000 volts in frequencies up to several thousand cycles per second. Linear extruding speeds have been used up to 100 feet per minute with various combinations and spacing of multiple discharge rings. Tubing treated in such manner can be used to fabricate a polyethylene container by either injecting a head on one end of a section of tubing or, less preferably, fusing or cementing an injection molded head piece to said end.

Another treating method well known to the art is the use of an oxidizing gas flame to heat the surface of the polyethylene and allow it to cool rapidly. This treatment can be done on the headed tube in which case the entire interior surface of the container can be treated. This method can be done simply by positioning the tubes momentarily over a special burner by slipping the open end of the container down over a relatively long thin nozzle with burner holes or slits on its outer surface. With such an arrangement the flame must be so adjusted as to be oxidizing but not too hot and the time for contact kept preferably by rotating the tube. This operation can also be facilitated by slipping the tube inside of a heavy metal tube to keep its outer surface cool.

Another treating method involves the use of oxidizing liquids or gases such as mixtures containing chromic acid, free chlorine, etc., followed by washing. Here also the treatment can be done on a headed tube in order to treat the entire enterior surface of the container including the inside of the head but excluding the seal area.

Following pretreatment of the polyethylene surface of the container, the coating may be applied by various means, all of which have a common important feature whereby coating material does not contaminate the seal area. In most of these various methods of coating enumerated below the container is most conveniently held in a vertical position with the head down and the open end of the container uppermost.

Example 1

Coating material is dispensed into the container through the open end by using a long nozzle, preferably a nozzle which moves in an axial direction dispensing liquid as it moves upward. The opening in the head of the container is left open and the rate of dispensing of the coating by the nozzle into the open end of the container is such that the level of the liquid in the container will rise to a predetermined level. At this predetermined level, the nozzle is shut off and the liquid coating material allowed to drain down through the opening in the head of the tube and the residual film left to dry.

Example 1a

Another variation of this same method is to use a stopper or plug in the headed end of the tube and following the dispensing of the liquid coating material into the tube through the open end to a predetermined level, the nozzle is closed and subsequently the plug is removed from the head and the liquid allowed to drain out. The predetermined level of the liquid coating material is adjusted so that there would remain a narrow uncoated band around the edge of the interior wall which allows heat sealing of the container without contamination by the coating.

Example 2

Another method for coating involves the use of a nozzle which creates a cone-shaped liquid flow pattern. This special nozzle is introduced into the open end of the container with the apex of the cone-shaped liquid flow pattern on top. The flow of liquid under pressure to this special nozzle is controlled by an appropriate means and the nozzle tip also can be moved mechanically in an axial direction inside the container. As the nozzle begins to move in an axial direction, pressure is applied at a predetermined time to the nozzle and liquid is caused to flow out of the nozzle against the interior wall of the container. The excess material is allowed to drain out through the open headed end. The nozzle continues to move in an axial direction until the conical shaped liquid flow pattern has covered the entire interior surface of the container at which time pressure ceases and the nozzle is withdrawn. The liquid pressure to the nozzle as well as the height of the nozzle is controlled so that there remains a narrow uncoated band around the edge of the interior wall which allows heat sealing of the container without contamination by the coating.

Example 3

Another method of coating involves the use of a nozzle of the pin point type which rotates about an axis concentric with the container axis. While rotating about this axis, the nozzle is caused to move in an axial direction into the open end of the container down towards the head. Here, also, pressure to the nozzle is accurately controlled so that at a predetermined location, liquid is applied to the interior container wall.

Example 4

Other known methods for applying liquid coatings may be utilized such as rollers, brushes, etc.

In the accompanying drawings:

Figure 1 is an elevation partly broken away of a tubular container having a fused plug closure at one end.

Figure 2 is a similar view showing a collapsible tube in which the walls are brought together and while pressured in contact, fused together to close the container at one end;

Figure 3 is a section showing a means for masking the surface of a band of material of the body at the joint or seal area thereof so that the same will be free of coating, this view being somewhat enlarged;

Figure 4 is an enlarged fragmentary view similar to Figure 2 in which a metal clip is pressed upon the lower end of the wall of the tube to compress the edges together and close the tube instead of fusing the edges of the wall together as in Figure 2; and Figure 5 is a sectional view showing a conventional metal can end crimped to the body instead of a fused plastic plug as in Figure 1.

Referring to the drawing, there is shown in Figure 1 a cylindrical tube of thermoplastic material, e.g., polyethylene, having a body wall 10 of a thickness of about .012" to .030" and closed at one end by any usual headpiece 11 terminating in a reduced neck 12 having a threaded or other desired cap receiving finish 13. This tube is treated, as described above, and is also provided with a protective sealing coat 14 over its entire interior surface except at that circumferential band portion or seal area 15 where the plug closure 16 of thermoplastic material, e.g., polyethylene, is fused as at 17 to the body wall 10. The lack of coating at this seal area of jointure on both the body wall 10 and the skirt 18 of the plug closure enables a fused leakproof sealed joint to be readily formed.

In Figure 2, the cylindrical body wall 10 has its edges brought together after the manner of the usual collapsible tube and while pressed together, fused into a flat seam in the well known manner to close the tube as shown at 19. This construction is otherwise similar to Figure 1 and the reference numerals indicate similar parts.

In any of the above methods of coating application a tight fitting collar 20 may be positioned inside the open end of the container, as in Figure 3, in order to mask the seal area 15 from the coating material during coating. This added feature eliminates the necessity of accurately controlling either the height of the coating liquid fill in Examples 1 and 1a above or the application of pressure to the nozzles in Examples 2 and 3 above, or the accurate location of the rollers or brushes in Example 4.

In each of the methods described in the above examples, the apparatus is of the conventional type and readily available on the open market. For this reason the same has not been illustrated.

Likewise, the coating solutions are all well known and it is to be understood that after they have been applied, they are dried in the usual manner to form a continuous film on the wall of the container.

In Figure 4, the cylindrical body wall 10 has its edges brought together after the manner of the usual collapsible tube and while the edges are thus pressed together, a U-shaped flexible clip 21 constituting a metal end is pressed over and encloses the opposed edges and then the whole is folded into sealed closed end, all as shown for example in the patent to Sillcocks, 1,914,584. In this connection and referring to Figure 5, the plastic plug closure may be replaced by a conventional metal disc or circular can end 22 having a peripheral groove 23, the end being united to the body 10 by pressing, e.g., crimping in the usual manner as shown in Figure 5 at 24 to seal the container.

In the constructions shown in Figures 4 and 5 the forming of the interior uncoated margin 15 is optional because where a metal end, e.g., a clip 21 or conventional can end 22, is used as in these constructions, the presence of the interior coating frequently is valuable in assisting the sealing effect obtained.

I claim:

1. A container of the class described, including a seamless container body of thermoplastic material having a reduced neck at one end and a sealing area at the other, a protective coating applied to the entire inner surface of the body including the neck but excepting said sealing area, and sealing means for closing the end of the body at said sealing area, said coating providing a slight thickness to the interior of the container and having an edge thereof bordering upon said sealing area, the edge of said coating being substantially engageable with said sealing means and serving as a deformable gasket to effectively seal said sealing means to the container body.

2. A container of the class described, including a seamless container body of thermoplastic material having a reduced neck at one end and a sealing area at the other, a protective coating applied to the entire inner surface of the body including the neck but excepting said sealing area, and a closure plug in sealing engagement with the sealing area and with an edge of said protective coating bordering upon said sealing area to provide a leakproof joint.

3. A container of the class described, including a seamless container body of thermoplastic material having a reduced neck at one end and a sealing area at the other, a protective coating applied to the entire inner surface of the body including the neck but excepting said sealing area, and a thermoplastic closure plug engageable with said sealing area and fused thereto to close the end of the container and to provide a leakproof joint.

4. A container of the class described, including a seamless container body of thermoplastic material having a reduced neck at one end and a sealing area at the other, a protective coating applied to the entire inner surface of the body including the neck but excepting said sealing area, and a metal end pressed into sealing engagement with the sealing area to close the end of the container and to provide a leakproof joint.

5. In a thermoplastic container of the class described, a seamless container body having a head and a reduced neck at one end and a sealing area consisting of a narrow marginal band at the other, and a relatively thin protective coating applied to the entire inner surface of the body excepting said sealing area.

6. A thermoplastic container of the class described, including a seamless container body having a head and a reduced neck at one end and a sealing area consisting of a narrow marginal band at the other, and a relatively thin protective coating applied to the entire inner surface of the body excepting said sealing area, said body being closed by heat sealing a portion of said sealing area to itself.

7. A container of the class described, including a seamless body of thermoplastic material having a reduced neck at one end and a sealing area at the other, and a protective coating applied to the entire inner surface of the body including the neck but excepting said sealing area, said coating having a slight thickness and having and edge thereof bordering upon said sealing area, an edge of said coating on opposing portions of the container interior surface being engageable and yieldable as a deformable gasket adjacent said sealing area when opposite portions of the latter area are brought together and fused to effectively seal the end of the container in a leakproof joint.

8. A thermoplastic container of the class described, including a seamless container body having a head and a reduced neck at one end and a sealing area consisting of a narrow marginal band at the other, a relatively thin protective coating applied to the entire inner surface of the body excepting said sealing area, and a thermoplastic closure plug to which the sealing area of said body is joined by heat sealing.

9. The method of completing a container blank having an open end and a tubular wall of thermoplastic material, and having a height substantially that of the wall of the finished container to provide a permeation resistant container mainly of plastic, which comprises pretreating the interior surface of the wall to render the thermoplastic material receptive to and retentive of coatings; applying a protective coating to the interior surface of the wall in such manner as to leave a clearly defined uncoated margin adjacent the open end thereof; and heat sealing the wall in the area of the uncoated margin thereof to close said open end with a secure leakproof joint.

10. The method defined in claim 9 wherein the pretreatment is effected by exposing the interior surface of the wall to a high voltage corona discharge continuously over at least the area to be coated.

11. The method of completing a container blank having an open end and a tubular wall of thermoplastic material, and having a height substantially that of the wall of the finished container to provide a permeation resistant container, which comprises pretreating a predetermined portion on the interior of the wall to render the thermoplastic material receptive to and retentive of coatings and to leave an untreated margin of said wall adjacent the open end thereof; applying a protective coating to said pretreated portion of the interior surface of the wall only; and heat sealing the wall in the area of the uncoated margin thereof to close said open end with a secure leakproof joint.

12. The method defined in claim 9 which includes inserting a plug closure of thermoplastic material into the open end of the blank and in which the plug is heat sealed to said uncoated margin to close the end of the blank.

13. The method defined in claim 9 wherein application of the protective coating to the interior surface of the wall is effected by spraying.

References Cited in the file of this patent

UNITED STATES PATENTS

| | | |
|---|---|---|
| 53,019 | Mathews | Mar. 6, 1866 |
| 1,166,862 | Smoot | Jan. 4, 1916 |
| 2,108,114 | Foard | Feb. 15, 1938 |
| 2,209,570 | Kraft | July 30, 1940 |
| 2,288,602 | Benton | July 7, 1942 |
| 2,458,570 | Davidson et al. | Jan. 11, 1949 |
| 2,626,647 | Barton | Jan. 27, 1953 |
| 2,679,875 | Baldanza | June 1, 1954 |
| 2,711,766 | Archer et al. | June 28, 1955 |
| 2,715,077 | Wolinski | Aug. 9, 1955 |
| 2,721,595 | Nichols | Oct. 25, 1955 |
| 2,781,551 | Richerod | Feb. 19, 1957 |
| 2,794,473 | Williams | June 4, 1957 |